Figure 1:
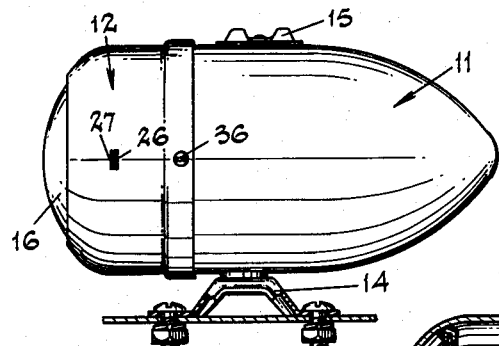

Sept. 22, 1953      L. A. SEISS      2,653,215

ELECTRIC BATTERY LAMP

Filed Feb. 15, 1952

INVENTOR.
Leonard A. Seiss
BY
Freeman Crampton
ATTORNEY

UNITED STATES PATENT OFFICE 2,653,215

ELECTRIC BATTERY LAMP

Leonard A. Seiss, Toledo, Ohio, assignor to The Seiss Manufacturing Company, Toledo, Ohio, a corporation of Ohio Application February 15, 1952, Serial No. 271,766

1 Claim. (Cl. 240—7.55)

My invention has to do with electric battery lamps, particularly bicycle and boat lamps. More specifically the invention is concerned with the problem of providing a simple and inexpensive electric battery holder means for such a lamp.

As is well known, an electric battery lamp has a case or shell housing. Within the housing, the lens, reflector, bulb, switch and battery elements are assembled and supported for cooperation. Ofttimes and particularly currently, the shell housing desired has a shape and size which is incongruous with that of the elements housed within it. For example the shell housing may be conformed to a shape and sized to proportions outlandishly excessive or incongruous to that required to provide enclosure for bulb, battery, and other elements but in good taste with the appearance and size of units on which the lamp is to be mounted or associated.

This presents the problem to the lamp builder of providing inexpensive mounting means within the housing to support the operational elements. My predecessors have attacked this problem. Essentially they suggest the use of battery holders which though relatively inexpensive have certain objectionable characteristics I propose to eliminate.

Principally these prior art battery holder constructions have no provision by which the reflector cone and lamp bulb may be supported. Hence it has been necessary, heretofore, to provide a separate means for holding the reflector cone. In most fields, this observation might pass unnoticed but in the lamp industry, each part or operation of assembly no matter how small, adds serious increments of cost. Thus, the omission of such part to hold the reflector cone on prior art battery holder constructions becomes costly to the ultimate lamp user.

I propose a battery holder which in conjunction with a closure for the housing provides a chassis frame supporting battery cell, lamp lens and reflector cone in assembled operative relation for withdrawal and insertion in the housing by mere opening and closing the closure.

More specifically, I propose to make a battery holder having integral extensions which form a bezel groove with the shell closure into which groove go the edges of the lamp lens and reflector cone to support these elements in desired relation. By this provision I eliminate a number of lamp parts and the assembly operations. Hence, I can produce a finished electric battery lamp at considerably less cost than my predecessors.

My invention has for another object to provide a battery holder formed from sheet metal, stamped and bent cylindrically to form a resilient clip embraceable of an electric battery cell. Thus, my invention provides easily and inexpensively formed battery mounting means.

Further, by the provisions of my invention, the battery holder stamping is cut and bent to have a pair of axially extending legs whose footed ends are arcuate and conform with the circular opening or port in the housing shell closure. Thus, the footed legs of the holder engage the mentioned lens and reflector cone positioned coaxially with said opening by simply positioning the stamping within the shell closure.

A still further object of my invention is to provide means for holding the well-known cylindrical electric dry cell in a "bluff" or rounded hollow shell lamp body or case of the shape popularly called "streamlined" (see p. 102 of Theory of Flight, by Von Mises; McGraw-Hill Book Company, 1945). More particularly, my invention has for an object to provide a battery cell holder for mounting the cylindrically shaped cell within an elliptic paraboloid open-ended shell of circular cross section whose diameter or "thickness" and length exceeds that of the cell. Even more particularly, it is the object of my invention to have said holder adapted to support the cell in spaced relation to the shell wall and with the longitudinal axis of the cell in parallel, and preferable coaxial, relation to axis of the shell. By supporting the cell in spaced relation to the shell wall, the likelihood of corrosion of the wall induced by cell deterioration is greatly reduced.

A further and more particular object of my invention is to provide means for holding a battery cell in a lamp shell case of the described shape which comprises a structural part of the closure means for the open end of the shell. By such provision, the cell is loaded into and withdrawn from within the case or shell as an incident to closing and opening the same. In this connection, my invention seeks to provide a cell holder means having projections engaging a cylindrical sleeve or wide ferrule closure whose outer contour approximates the surfaces of the paraboloid case near its open end over which surfaces the sleeve edges telescopically fit, to close and complete the contour of the case. Said projections, provided by my invention, are integral with the cell holder portions and resiliently engage the sleeve at plural points.

In addition, that said projection provides means for holding lens reflector and bulb mounting within the sleeve and coaxially to the ported end thereof is another particular object of my invention. Thus, when the sleeve and case are interfitted the entire lamp and its elements will assume operating relation. When desiring to service the lamp elements and the lamp case is opened for that purpose, the elements will be brought to full view, chassis-wise, from within the case or housing as an incident of opening the case.

The invention consists in other features and advantages which will appear from the following description and upon examination of the drawings. Structures containing the invention may partake of different forms and still embody the invention. To illustrate a practical application of the invention, I have selected an electric battery lamp as an example of the various structures and details thereof that contain the invention and shall describe the selected structure hereinafter, it being understood that variations may be made without departing from the spirit of the invention. The particular structure selected is shown in the accompanying drawings and described hereinafter.

Figure 2:
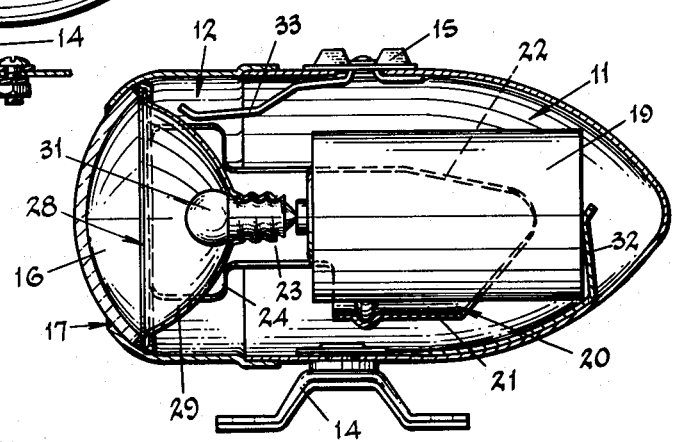
Figure 3:
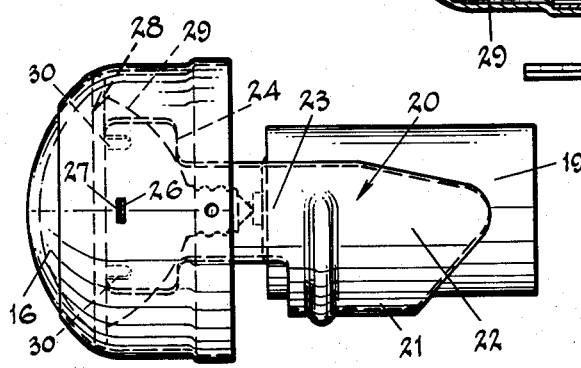
Figure 4:
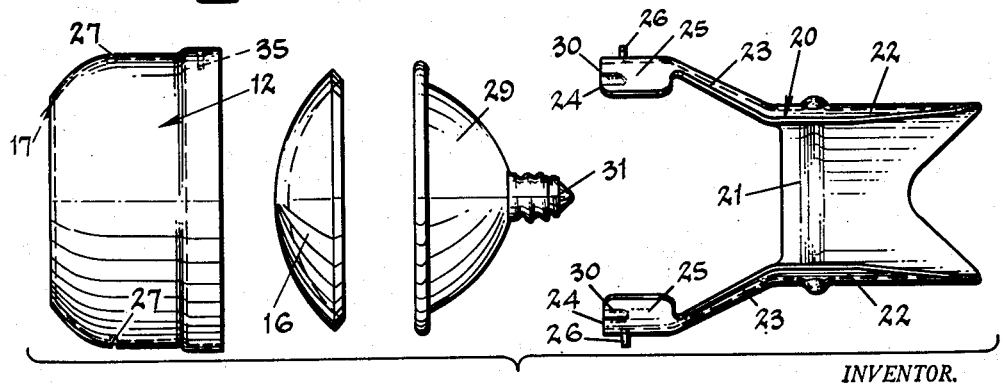

Figure 1 of the accompanying drawing illustrates a side elevation of an electric battery lamp having the features of my invention. Figure 2 illustrates an enlarged view of a longitudinal section of the lamp shown in Figure 1. Figure 3 illustrates a side elevation of the battery holder and case closure in open position. Figure 4 illustrates a view of the battery holder in plan with the parts associated therewith in spaced but related position thereto.

The electric battery lamp shown in the accompanying drawing is enclosed in a case. Preferably, the case comprises a shell housing 11 and a closure cover 12 therefor. To mount the lamp on a bicycle, boat or similar place, a means, such as the bracket 14 is provided on the housing 11. The case encloses the power and operating elements of the lamp, such as a suitable dry cell, a bulb, reflector, lens, and switch. The switch of the lamp shown has an operating button 15 mounted for operation in one side of the housing 11. The lens of the particular lamp shown is a concave glass disc 16, mounted in coaxial and closing relation to an opening or port 17 in the cover 12.

From Figure 1 it will be immediately apparent that the case of the electric battery lamp is "streamlined". The lens disc 16 forms the leading end or face. The housing 11 has the shape of an open ended, elliptical paraboloid of the class whose base sections are circular. The closure 12 is a sleeve-like, wide ferrule defining at one end the mentioned port 17 and at the other end adapted to telescopically fit over the open end and lateral surface of the paraboloid housing 11. The closure 12, when assembled with the housing 11, completes the case and imparts a style popularly associated with speed by reason of supposed lesser wind resistance. Such a lamp has greater market appeal than others, not so shaped.

However, as will be seen from Figure 2 of the accompanying drawing, a housing of this desired shape presents a serious problem of mounting a cell element, such as the battery 19 which has the "standard" cylindrical shape and size known to the art. Particularly, the problem arises out of the incongruency between the shapes and sizes of the battery 19 and the interior of the housing 11.

To meet this problem I propose to provide a battery holder unit 20. The battery holder unit shown in the accompanying drawing comprises a sheet metal blank. The blank is cut and bent to have a central cradle part 21, opposite resilient wings 22 on either side of the cradle part and forwarding projecting legs 23 integral with the wings 22. The legs 23 each have an arcuate foot 24 coinciding, circularly speaking, with the inner surface of the cover 12. Preferably, the feet 24 each have cylindrically extending surface portions 25, as seen in Figure 4 of the drawing. The portions 25 "fit" and closely engage the inner surface of cover 12 adjacent to the port 17 therein.

The portions 25 may each have means such as the struck tongue 26 which engages in a slit 27 in the cover 12 to thus lock the holder unit 20 and cover 12 in assembled "chassis" relation. Preferably, the slit 27 and tongue 26 are so related to the edges of the portions 25 and of the port 17 in the cover 12 that said edges are held in spaced bezel groove forming relation. A groove 28 thus is formed and provides a mounting to receive the edges of the lens disc 16 and a bulb-supporting reflector cone 29. If desired, the portions 25 have dimples, notches or beads, like those shown at 30, formed near said groove forming edges of portions 25. These protuberances have the effect of increasing the depth and retentive ability of the grooves 28, in engaging the lens and reflector cone.

The cradle part 21 of the holder unit is arcuate when viewed endwise and receives a battery cell 19 in cradling relation. The wings 22 upstand along each side of the cradle part are also arcuate and resiliently embrace the cell. In so doing, the cell 19 is held firmly relative to bulb 31 in the cone 29 and a conductor strip 32 in the housing 11. This relation makes an operating circuit possible about actuation of the switch button 15 and its connected conductor strip 33. Also, the embracement of battery by the wings 22 and cradle 21 makes a complete "chassis" supporting the operating parts, whose availability for inspection, repair or replacement occurs coincident with opening the lamp case.

In engaging the cell 19, the wings 22 exert forces in a direction relative to the central longitudinal axis which is opposite to the direction of the forces exerted by the portions 25 engaging the inner surfaces of the cover 12. These contra forces exert a balanced stress on and through the legs 23. As a consequence, these wings and portions 25 perform their respective functions of embracing the cell and engaging the closure 12 to maintain the elements assembled for a long period of time.

If desired, the cover 12 may have a locking struck tongue 35 and screw 36 for fixedly preventing dislodgment of the cover 12 from the housing 11. It will be seen that I provide means by which an electric lamp of a widely desired streamline shape may be inexpensively made and maintained to operate efficiently for a long period of time. Also the holder supports the cell 19 in spaced relation to the shell wall thus reducing the likelihood of wall corrosion due to deterioration of the cell.

While I have illustrated and described the best form of my invention now known to me, as required by the statutes, those skilled in the art will readily understand that changes may be made in the disclosed construction without de-

I claim:

In an electric battery lamp having a housing comprising an open-ended elliptic parabaloid shell of circular section with a ported cylindrical sleeve closure telescopically engaging the surfaces of said shell adjacent to its open end and an electric battery cell, a lens, and a reflector within said housing, the provision of a battery cell holder comprising a sheet metal blank having integral cradle, wing and leg parts; the cradle part extending lineally and arcuately in section and adapted to approximate the cylindrical contour of said battery cell, each wing part located along opposite edges of the cradle part and being arcuate in section and adapted to embrace said cell and clasp it against the cradle part, each leg part comprising an integral axial extension of a wing part; each leg part having an integral and arcuate extending foot portion approximating a segment of the sleeve closure inner surface, each foot portion having a plurality of radially arranged beads along the edge of said foot, a tongue on one foot portion adapted to engage said sleeve closure and hold one edge of said foot portion spaced from the sleeve closure port a distance greater than the total edge thickness of the lens and reflector elements thereby to provide a bezel groove between said beads and the sleeve closure port to receive said lens and reflector edges and support said lens and reflector.

LEONARD A. SEISS.

References Cited in the file of this patent

UNITED STATES PATENTS

| Number | Name | Date |
|---|---|---|
| 2,204,707 | Seiss | June 18, 1940 |